(12) United States Patent
Thompson et al.

(10) Patent No.: US 6,447,131 B1
(45) Date of Patent: Sep. 10, 2002

(54) NO-ADHESIVE APPLIQUE FOR VEHICLE INSTRUMENT CLUSTER

(75) Inventors: Loren Michell Thompson, Hadely; Jerry Lee Trevillian, Flint, both of MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/648,973

(22) Filed: Aug. 28, 2000

(51) Int. Cl.⁷ ............................................... G01D 11/28
(52) U.S. Cl. ............................ 362/26; 362/30; 362/29
(58) Field of Search ........................ 362/26, 27, 23, 362/489, 29, 85; 116/286, 287, 288

(56) References Cited

U.S. PATENT DOCUMENTS 4,233,927 A * 11/1980 Oikawa ...................... 116/287
5,911,492 A * 6/1999 Perry .......................... 362/26
6,070,549 A * 6/2000 Luchi ......................... 116/287

* cited by examiner

Primary Examiner—Sandra O'Shea
Assistant Examiner—Hargobind S. Sawhney
(74) Attorney, Agent, or Firm—Jimmy L. Funke

(57) ABSTRACT

In a preferred embodiment a vehicle instrument, comprising: a housing; a light pipe disposed in said housing; an applique disposed on a face of said light pipe; and a retainer disposed over said face of said light pipe, said retainer having structure pressing against an outer periphery of said applique to hold said applique against said face of said light pipe, said applique having no other means of attachment to said face of said light pipe.

13 Claims, 8 Drawing Sheets

NO-ADHESIVE APPLIQUE FOR VEHICLE INSTRUMENT CLUSTER

BACKGROUND OF THE INVENTION

1. Field of the Invention

The present invention relates to vehicle instrument clusters generally, and, more particularly, to a novel applique for such instrument clusters that requires no adhesive.

2. Background Art

Vehicle instrument clusters of the type under consideration here are found, for example, in automobiles, trucks, and the like. The graphics on such instrument clusters typically are incorporated in applique substrates, the applique substrates being attached to an underlying surface by means of mechanical fasteners or adhesives to control applique loads encountered within service environments. Consequently, applique fasteners and other attachment processes are employed within the final instrument cluster design, which can significantly and adversely affect unit cost and complexity, as well as not being entirely satisfactory in some instances.

Accordingly, it is a principal object of the present invention to provide an applique for an instrument cluster that does not require an adhesive or mechanical fasteners.

It is an additional object of the invention to provide such an applique that is economical and easy to apply.

It is a further object of the invention to provide such an applique that can be used in multi-gage instrument clusters.

It is another object of the invention to provide such an applique that is resistant to mechanical and thermal loads.

Other objects of the invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a vehicle instrument, comprising: a housing; a light pipe disposed in said housing; an applique disposed on a face of said light pipe; and a retainer disposed over said face of said light pipe, said retainer having structure pressing against an outer periphery of said applique to hold said applique against said face of said light pipe, said applique having no other means of attachment to said face of said light pipe.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
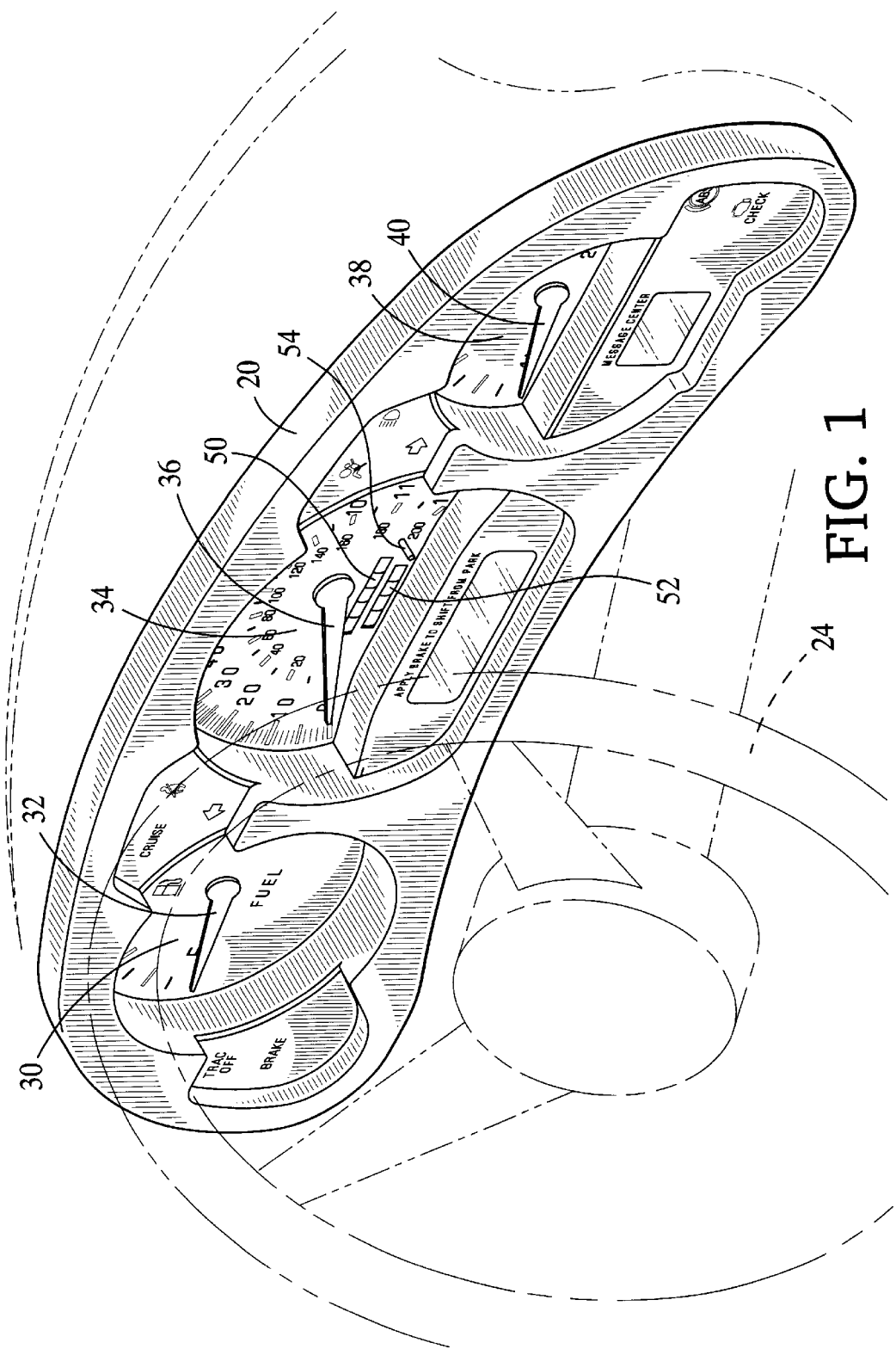
FIG. 1 is an isometric view of the type of instrument cluster in which the present invention may be employed.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Referring now to FIG. 1, there is illustrated the type of vehicle instrument cluster in which the present invention may be employed, the instrument cluster being indicated by the reference numeral 20. Vehicle instrument cluster 20 is mounted in a vehicle dashboard 22 behind, or forward of, steering wheel 24 of the vehicle (not otherwise shown). Vehicle instrument cluster 20 includes a fuel gage area 30 with a pointer 32, a speedometer gage area 34 with a pointer 36, and an engine temperature gage area 38 with a pointer 40. Speedometer gage area 38 includes an odometer 50 that gives the total distance the vehicle has traveled and a trip odometer 52 that gives a shorter distance the vehicle has traveled, the trip odometer being able to be reset to "zero" by means of a person pressing the distal end of an odometer reset stem 54. Trip odometer 52 may be used, for example, to measure the distance between two selected locations. It will be understood that the graphics on instrument cluster 20, for example the speed markings on speedometer gage area 34 are on an applique that has been adhesively or mechanically attached to an underlying substrate (not shown on FIG. 1). Commonly, the underlying substrate is flat or slightly convex.

Figure 2:
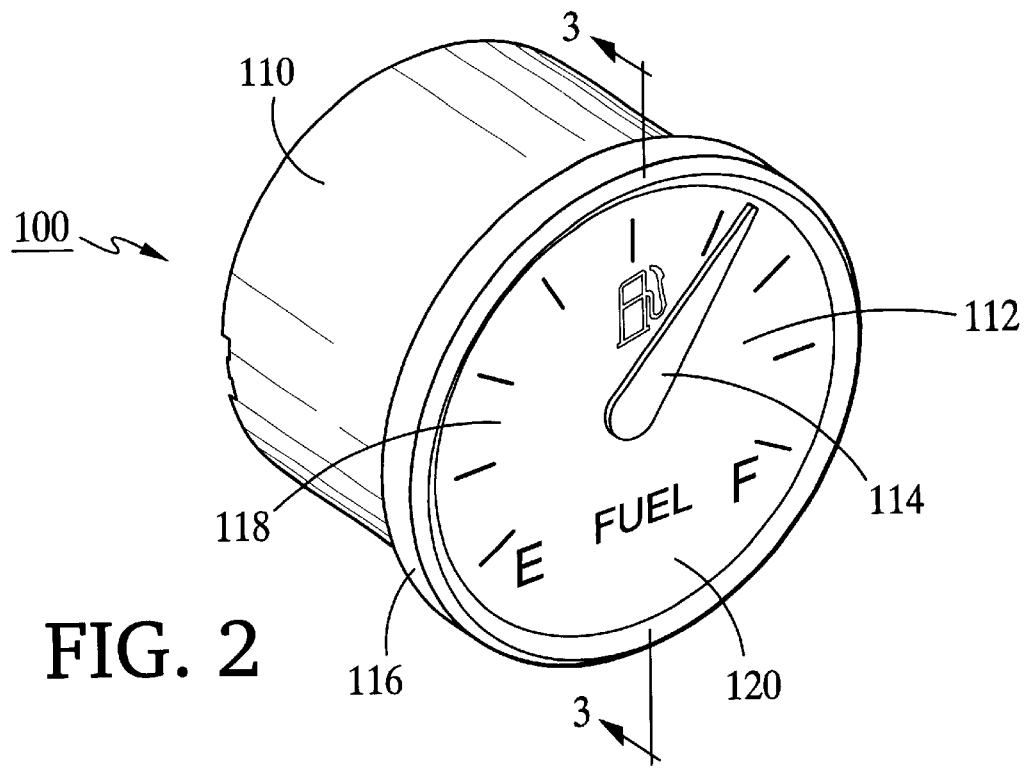
FIG. 2 is an isometric view of an instrument housing employing the present invention.

FIG. 2 illustrates an instrument that may be, for example, the fuel gage on vehicle instrument cluster 20 (FIG. 1), the instrument being indicated generally by the reference numeral 100. Instrument 100 includes a housing 110, a gage area 112, a pointer 114, a retainer 116 surrounding the front of the housing, and an applique 118. The graphics shown on gage area 112 are incorporated in applique 118 on the face of the gage area. A substantially clear lens 120 is disposed over the face of gage area 112.

Figure 3:
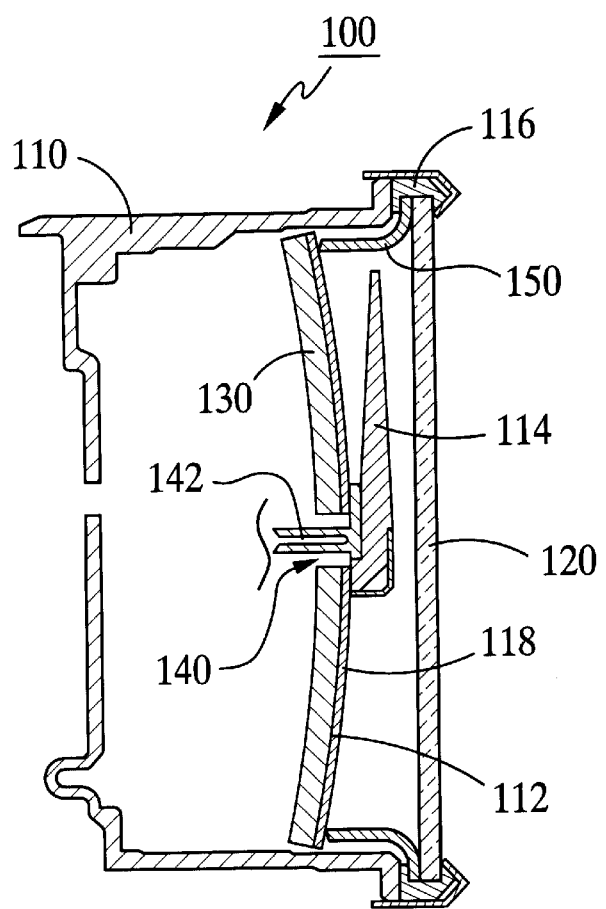
FIG. 3 is a fragmentary, side elevational view, in cross-section, taken along line "3—3" of FIG. 2.

FIG. 3 illustrates instrument 100 shows applique 118 disposed on the face of a convex light pipe 130 that is held in housing 110 by conventional means. For illustrative purposes, the curvature of light pipe 130 is shown somewhat exaggerated on FIG. 3. For typical automotive applications, the crown of light pipe 130 extends outwardly about 0.2–0.75 millimeter from the rim of the light pipe. The hump is also located at the center of light pipe 130 and a hole 140 defined through the light pipe at that location accommodates the shaft 142 of pointer 114. It is also seen on FIG. 3 that retainer 116 encircles lens 120 and holds the lens to housing 110. A circular retainer leg structure 150 extends inwardly from the rim of retainer 116 and presses applique 118 against light pipe 130, thus holding the applique in place. No other means of attachment of applique 118 to light pipe 130 is required or employed.

Thermal and mechanical loads must be taken into account when designing a system according to the present invention.

Thermal loads can be divided into three categories: (1) ambient temperature loading, (2) sun loading, and (3) illumination lamp loading.

Figure 4:
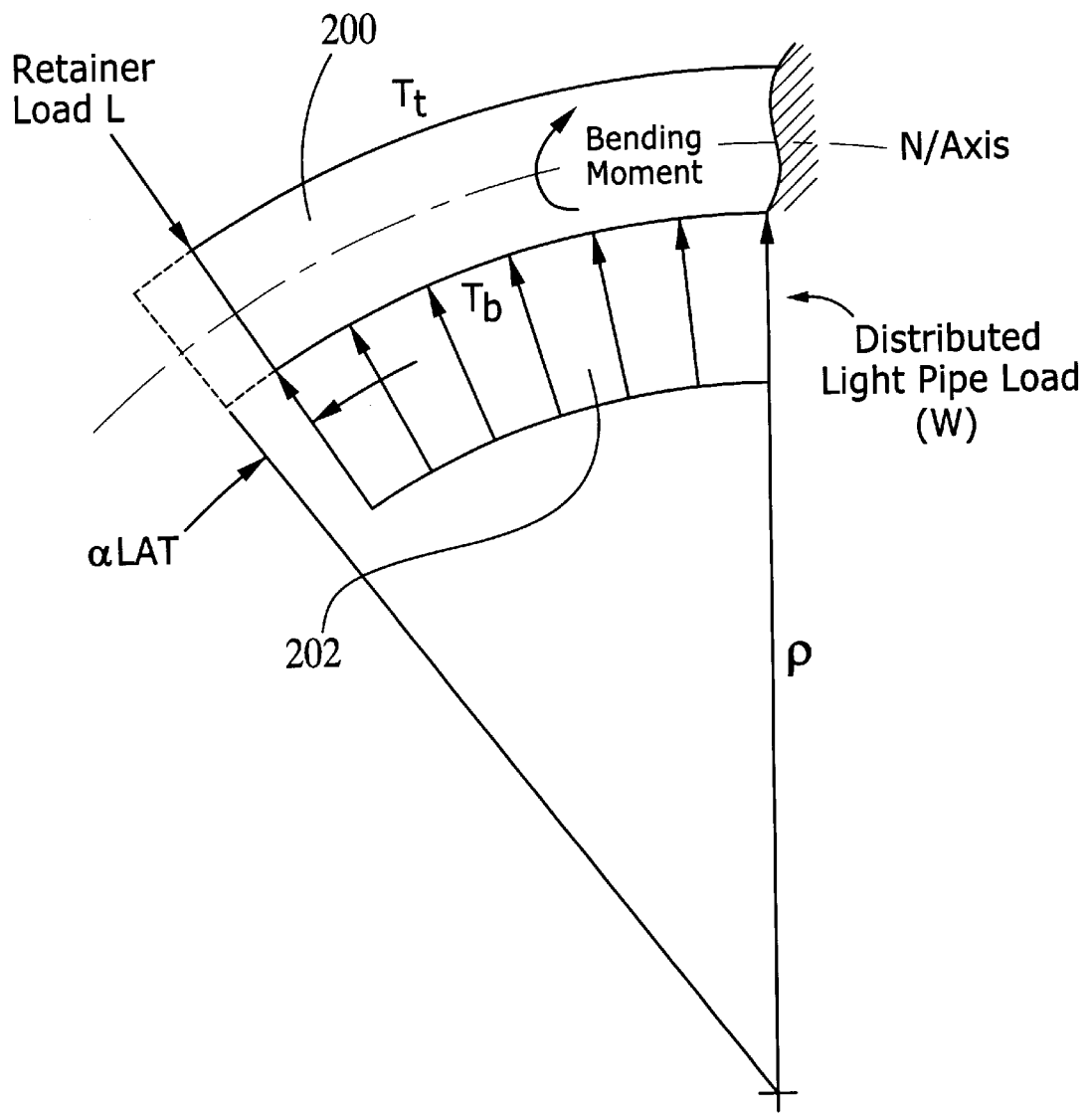
FIGS. 4–7 are free body diagrams illustrating various mechanical and thermal load considerations that must be taken in to account when designing a system according to the present invention.

FIG. 4 is a free body diagram illustrating a segment of a no-adhesive applique 200 disposed on a light pipe 202 in the situation in which the ambient temperature, or the outer surface temperature, of the applique, $T_t$, equals or nearly equals the temperature of the inner surface of the applique, $T_b$. This situation exists, for example, when there is no external heat input from sources such as the sun or an illumination lamp. Given this state, the surfaces of applique 200 allowed to expand/contract at uniform magnitudes in the radial direction and, therefore, do not generate significant shear forces and corresponding bending moments within the applique. Assuming sufficient applique radial clearance is provided within the assembly, applique 200 is allowed to expand/contract radially without concern for buckling at the point hub (not shown).

Figure 5:
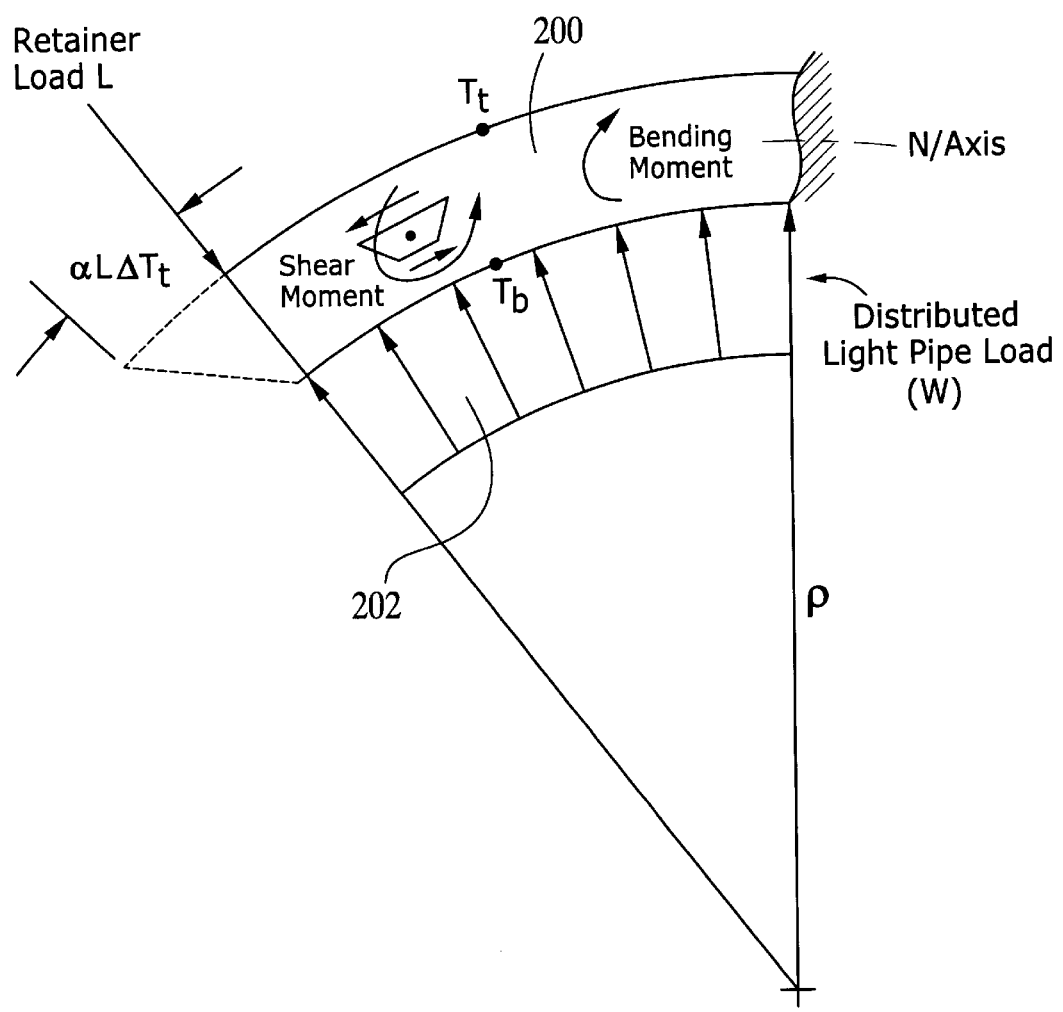

FIG. 5 is a free body diagram illustrating the case in which, due to the thermal resistance of the material of applique 200, sun loading has produced an upper surface temperature of the applique, $T_t$, that is higher than the lower surface temperature of the applique, $T_b$. As applique 200 expands radially when exposed to this environment, an unequal change in arc length occurs between the top and bottom surfaces of the applique, as is indicated at the left side of the diagram, which generates unbalanced shear forces within the applique. These unbalanced shear forces induce in internal bending moment, $M_s$, in opposition to the bending moment, $M_b$, created by deflection of applique 200 when capture in the assembly. To prevent applique 200 from buckling at the pointer hub (not shown), the design should incorporate a spherical radius which produces an $M_b$ in excess of $M_s$, under worst case sun loading conditions. $M_b$ can be approximated by EI/p of applique 200.

Figure 6:
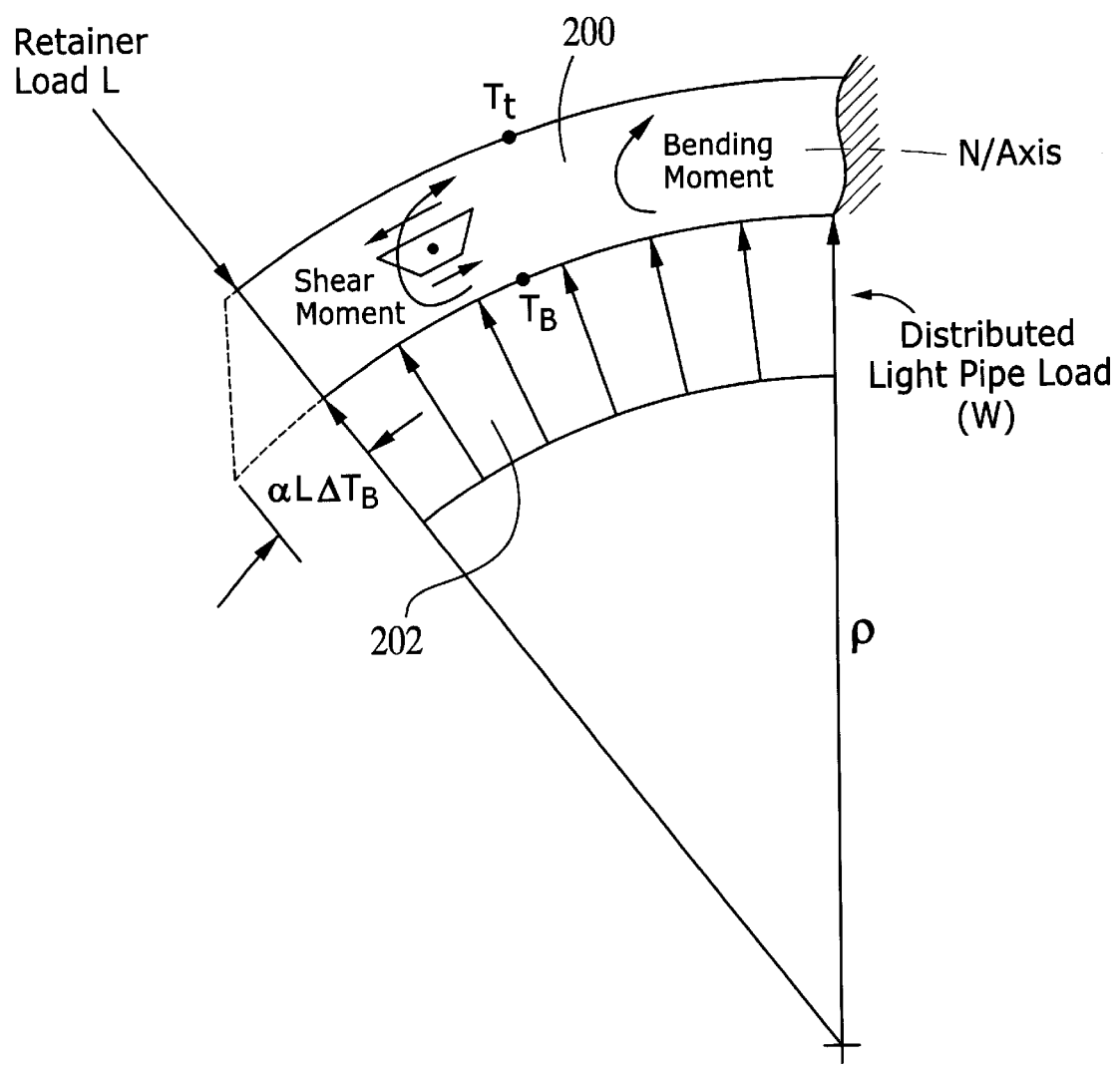

FIG. 6 is a free body diagram illustrating the case in which again, due to the thermal resistance of the material of applique 200, illumination lamp loading, that is, the illumination lamp is located behind the lightpipe, the radial expansion due to temperature between the outer and inner surfaces of the applique is unequal. This, in turn, produces unbalanced internal shear forces. This state of imbalance induces a bending moment $M_s$, in the same direction as $M_b$, and allows the applique to behave like a bimetallic spring. The bending moments, acting in unison, produce both an increase in load at the retainer interface as well as an increase in the reaction load at the surface of lightpipe 202 against which applique 200 is disposed Consequently, applique 200 is in a very stable state under these conditions.

Figure 7:
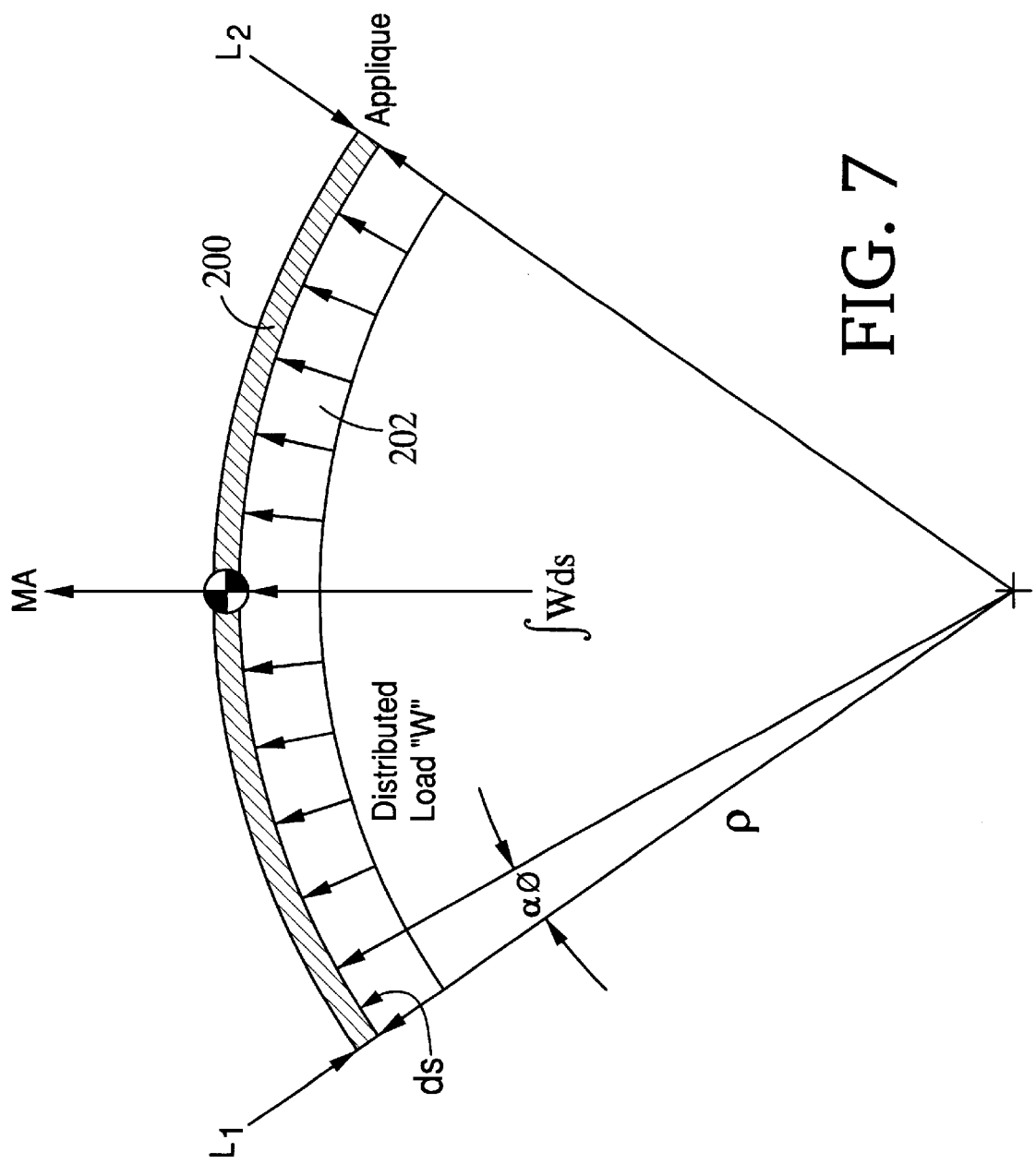

FIG. 7 is a free body diagram illustrating the forces involved when acceleration forces generated by induced vibration tend to displace applique 200 away from the surface of lightpipe 202. This condition can potentially create unfavorable noise and pointer trapping conditions within the end service environment. However, an applique which has been placed over a spherical surface and retained about its perimeter has a natural ability to resist this condition. As shown in the diagram on FIG. 6, a distributed load, W, is generated between applique 200 and lightpipe 202 when their surfaces are in contact with one another. The distributed contact load is equal to the sum of reaction forces, L1 and L2, at the retainer and proportional to the radius of curvature, ρ, of applique 200 because the applique is flat in its uninstalled condition. Given the forces illustrated in the diagram on FIG. 6, applique 200 would remain in contact with the surface of lightpipe 202 until acceleration forces had sufficient magnitude to reduce the resultant distributed load, ∫Wds, to zero. Therefore, a design should employ a radius of curvature that would resist the worst case acceleration forces.

Figure 8:
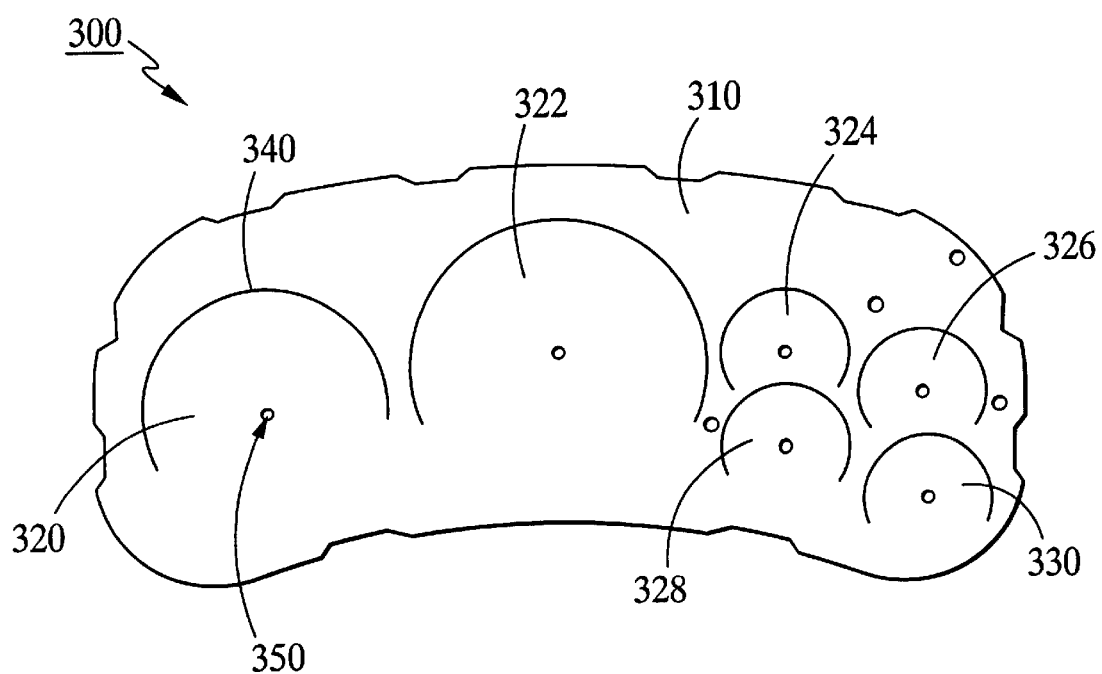
FIG. 8 is a front elevational view of a no-adhesive applique for use in a multi-gage environment.

FIG. 8 illustrates a no-adhesive applique, generally indicated by the reference numeral 300, for use in a multi-gage environment, that is, a vehicle instrument cluster having several gages. Applique 300 is shown without the graphics thereon and includes a single sheet of material 310. Gage areas 320, 322, 324, 326, 328, and 330 are defined in sheet 310 by perforating the outline of each, such as perforation line 340 formed around gage area 320. This utilizes strategically placed perforation lines in a single applique to allow the single component to behave as several individual entities. Each perforation line is approximately 1 mm wide. It will be noted that, in this case, the gage areas are not complete circles, but are segments of circles.

The perforation lines are placed externally to any graphics and beneath retainer floor material for aesthetic reasons as well as to provide a reaction surface and adequate light shielding from illumination lamps. In addition, this feature should be implemented at locations where large thermal gradients exist at the surface of applique 300, such that applique "zones" are developed that have somewhat uniform temperatures. For example, tell-tale cavity areas should be isolated from rear illumination areas within the applique. Furthermore, each perforation line must be continuous and sufficient in length to reduce the buckling potential of material 310 when exposed to operating environments. Each gage area has a hole defined through the center thereof, such as hole 350 in gage area 320 to accommodate the insertion therethrough of a pointer shaft.

Such an arrangement provides economy in manufacturing and handling, in that a single applique sheet is employed rather than using six different appliques which would otherwise be the case. Use of a single sheet also facilitates final assembly, since only the single sheet needs to be positioned.

Figure 9:
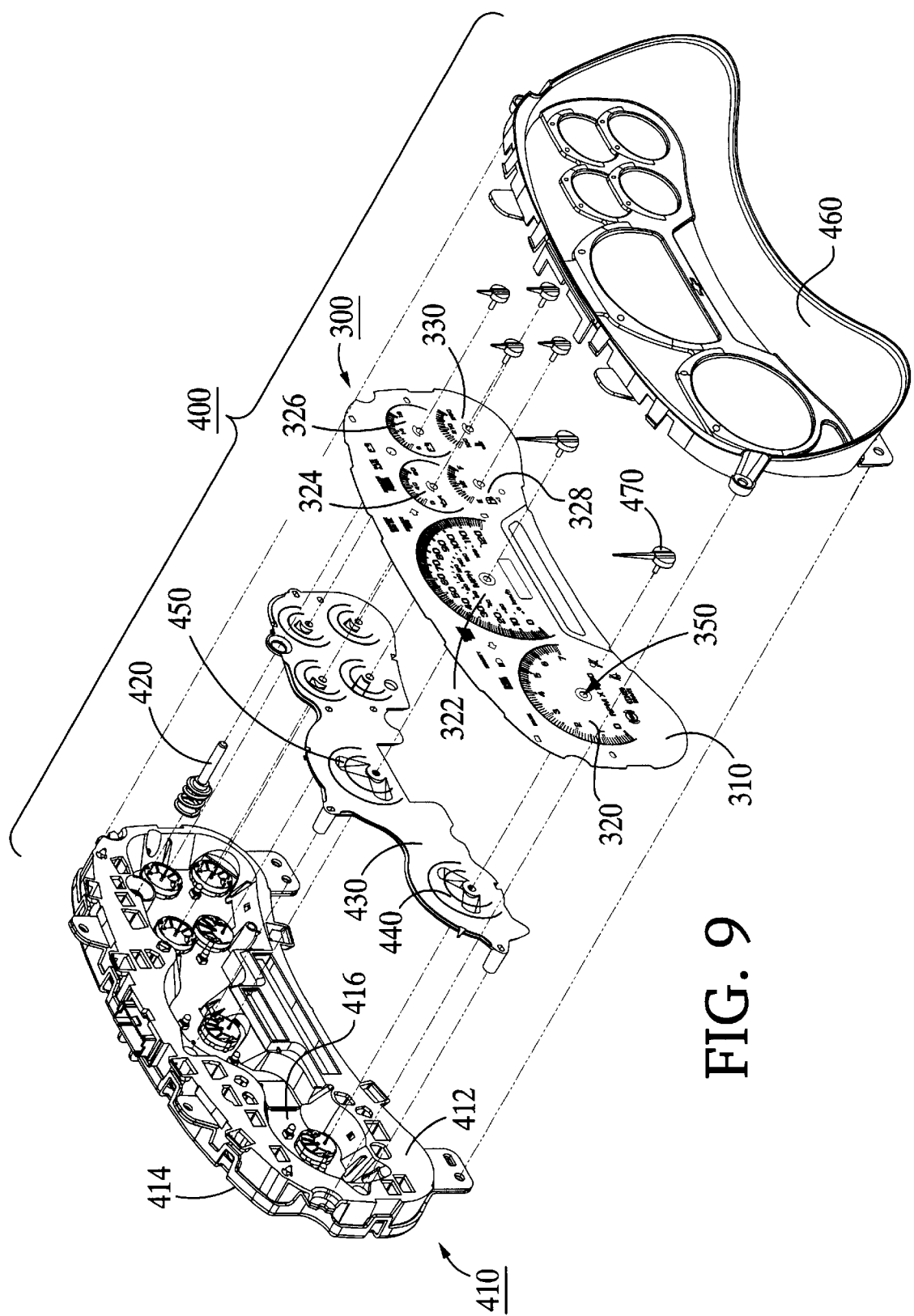
FIG. 9 is an exploded isometric view of the applique of FIG. 8 used in a multi-gage environment.

FIG. 9 illustrates applique 300 with graphics thereon and in relation to other components of a vehicle instrument cluster, generally indicated by the reference numeral 400. Instrument cluster 400 includes a case assembly, generally indicated by the reference numeral 410, the case assembly including a case 412, a rear cover 414, and a printed circuit board 416. It will be understood that case assembly 410 includes therein conventional instrument devices, illumination lamps, and other conventional components not separately described. Also shown is a trip odometer reset stem 420.

A single-sheet lightpipe 430 is disposed between applique 300 and case assembly 410, the lightpipe having formed therein convex areas, such as area 440, coincident with corresponding gage areas on applique 300, such as gage area 320. In accordance with the present invention, the crown of each convex area is at the pointer hole for that convex area. A plurality of light pickups, as at 450, is provided on the rear surface of lightpipe 430 to gather light from illumination lamps in case assembly 410. In accordance with the present invention, a retainer assembly 460 is disposed against applique 300 to press the edges of the individual gage areas of applique 300 against light pipe 430 in the manner described above. Additional trim elements (not shown) may be placed over retainer assembly 460.

Having light pipe 430 formed from of a single sheet of material affords the same advantages as having applique 300 formed of a single sheet of material, in that the single sheet is employed in place of multiple lightpipes that would otherwise be used in vehicle instrument cluster 400.

Completing the elements shown for instrument cluster 440 is a plurality of conventional pointers, as at 470.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like when used herein refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A vehicle instrument, comprising:
   (a) housing;
   (b) a light pipe disposed in said housing, said light pipe having a convex shape;
   (c) an applique disposed on a convex face of said light pipe; and
   (d) a retainer disposed over said convex face of said light pipe, said retainer having structure pressing against an outer periphery of said applique to arcuately hold said applique against said convex face of said light pipe, said applique having no other means of attachment to said convex face of said light pipe.

2. A vehicle instrument, as defined in claim 1, wherein: a crown of said light pipe extends outwardly about 02–0.75 millimeter.

3. A vehicle instrument, as defined in claim 1, further comprising: an opening defined through said light pipe at a crown thereof for the insertion therethrough of a pointer shaft.

4. A vehicle instrument, as defined in claim 1, wherein: an area of said light pipe covered by said applique is arcuate.

5. A vehicle instrument, as defined in claim 1, wherein: and area of said light pipe covered by said applique is circular.

6. A vehicle instrument, as defined in claim 1, wherein: a crown of said light pipe is equidistant from all points on said outer periphery of said applique.

7. A vehicle instrument cluster
   (a) a housing;
   (b) a light pipe disposed in said housing, said light pipe having a plurality of first gage areas;
   (c) an applique disposed on a face of said light pipe covering each of said plurality of first gage areas, said applique having a plurality of second gage areas coextensive with said plurality of first gage areas, each of said plurality of second gage areas having its outer periphery defined by a line of perforations; and
   (d) a retainer disposed over said face of said light pipe, said retainer having structure pressing against said outer periphery of each of said plurality of second gage areas to hold each of said plurality of second gages areas against said face of said light pipe, each of said plurality of second gage areas having no other means of attachment to said plurality of first gage areas.

8. A vehicle instrument, as defined in claim 7, wherein: each of said plurality of first gage areas is convex.

9. A vehicle instrument, as defined in claim 8, wherein: a crown of each of said plurality of first gage areas extends outwardly about 02–0.75 millimeter.

10. A vehicle instrument, as defined in claim 8, further comprising: openings defined though each of said plurality of first gage areas at crowns thereof for the insertion therethrough of pointer shafts.

11. A vehicle instrument, as defined in claim 8 wherein: each crown of each of said plurality of first gage areas is equidistant from said outer periphery of a second gage area covering said each of said plurality of first gage areas.

12. A vehicle instrument, as defined in claim 7 wherein: an area of at least one of said plurality of first gage areas is arcuate.

13. A vehicle instrument, as defined in claim 7, wherein: an area of at least one of said plurality of first gage areas is circular.

* * * * *